United States Patent [19]

Preus

[11] 4,111,813

[45] Sep. 5, 1978

[54] HYDROCARBON CONTAINMENT AND CONTROL SYSTEMS

[76] Inventor: Paul Preus, 21 Smith Rd., Toms River, N.J. 08753

[21] Appl. No.: 843,460

[22] Filed: Oct. 18, 1977

Related U.S. Application Data

[63] Continuation-in-part of Ser. No. 729,713, Oct. 5, 1976, Pat. No. 4,065,923.

[51] Int. Cl.² .......................... B01D 27/02; C02B 9/02
[52] U.S. Cl. .................................. 210/282; 210/484; 210/505; 210/DIG. 26
[58] Field of Search ............................ 150/1.7, 7, 12; 206/806; 210/40, 242 AS, 232, 237, 238, 282, DIG. 26, 484, 502, 503, 505

[56] References Cited

U.S. PATENT DOCUMENTS

| 3,666,107 | 5/1972 | Boggs et al. | 210/238 |
|---|---|---|---|
| 3,680,706 | 8/1972 | Baer et al. | 210/238 |
| 3,951,812 | 4/1976 | Hsu | 210/282 |
| 3,998,060 | 12/1976 | Preus | 61/1 F |
| 4,061,573 | 12/1977 | Biron | 210/DIG. 26 |

OTHER PUBLICATIONS

"Sorbent C", Clean Water, Inc. company brochure, No. 73-2, 1973.

*Primary Examiner*—Charles N. Hart
*Assistant Examiner*—Ivars Cintins
*Attorney, Agent, or Firm*—Harold L. Stowell

[57] ABSTRACT

A hydrocarbon containment and control system consists of forming a porous woven container having at least one hand grip along one edge seam, at least one opening through a pair of opposed side walls but closed to the interior of the container and an open seam, filing the container through the open seam with an oleophilic-hydrophobic-lighter than water hydrocarbon absorbent, closing the open seam, and thereafter placing the filled container in the path of hydrocarbons to be selectively absorbed.

1 Claim, 16 Drawing Figures

U.S. Patent  Sept. 5, 1978  Sheet 1 of 5  4,111,813
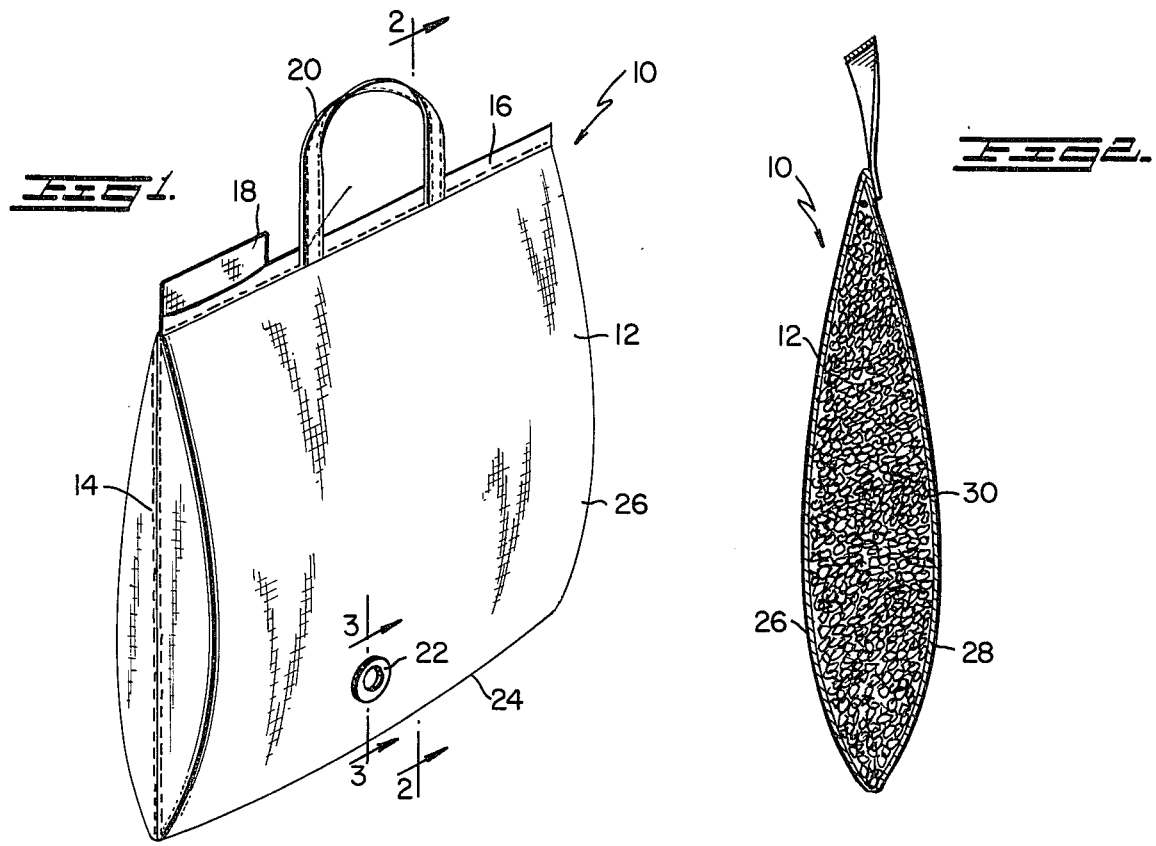
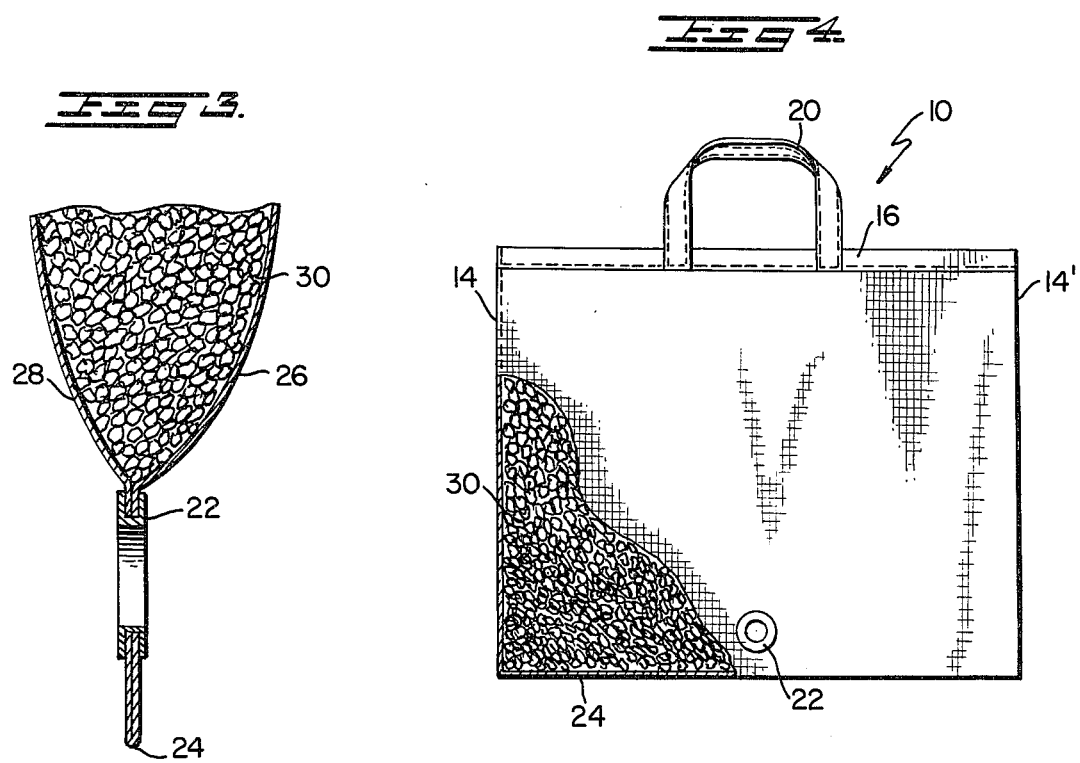

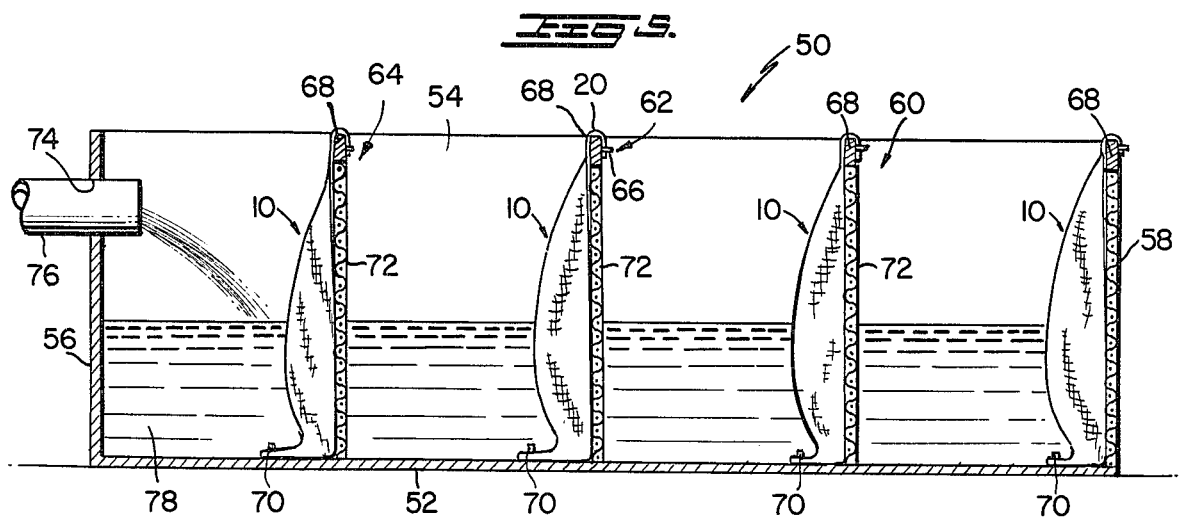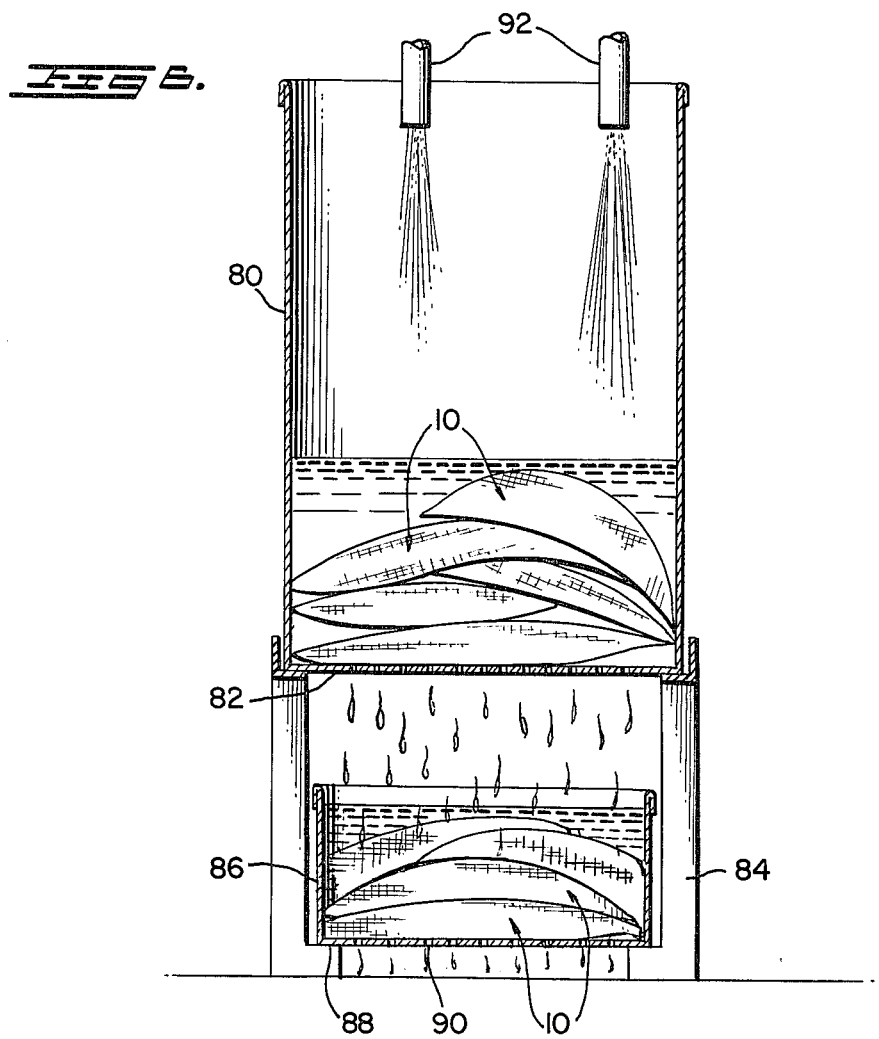

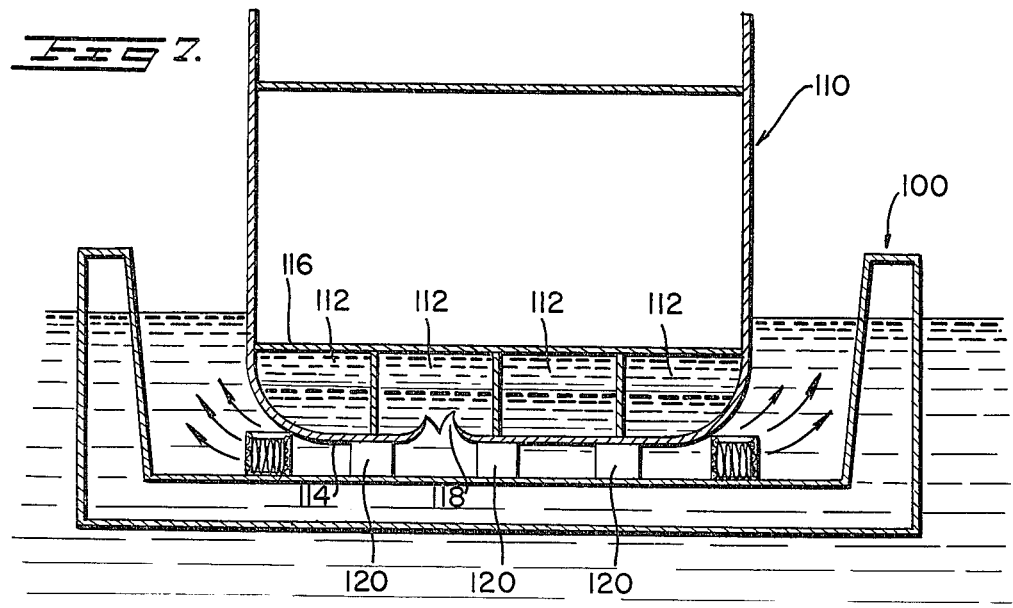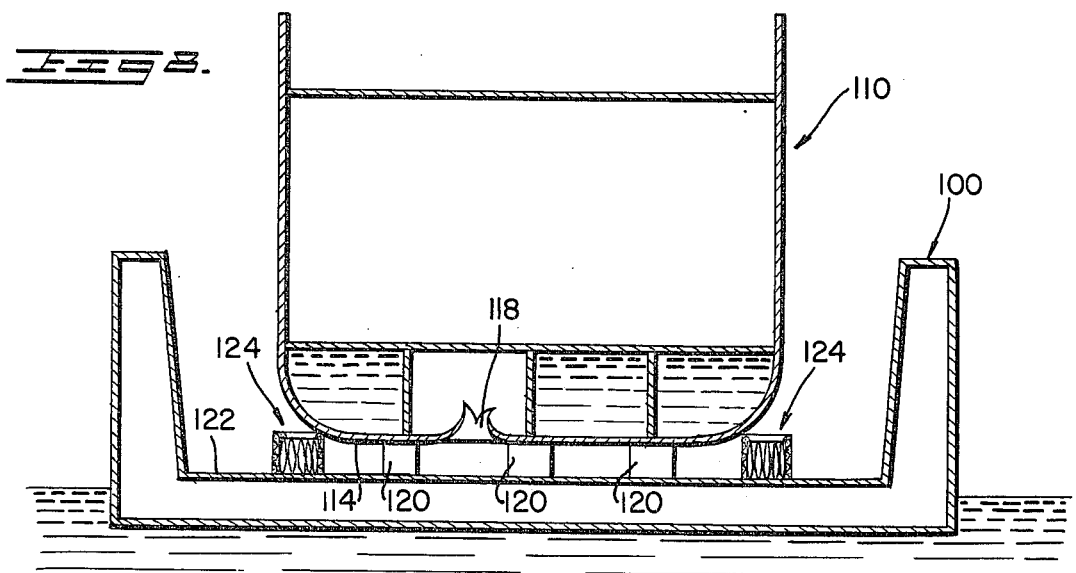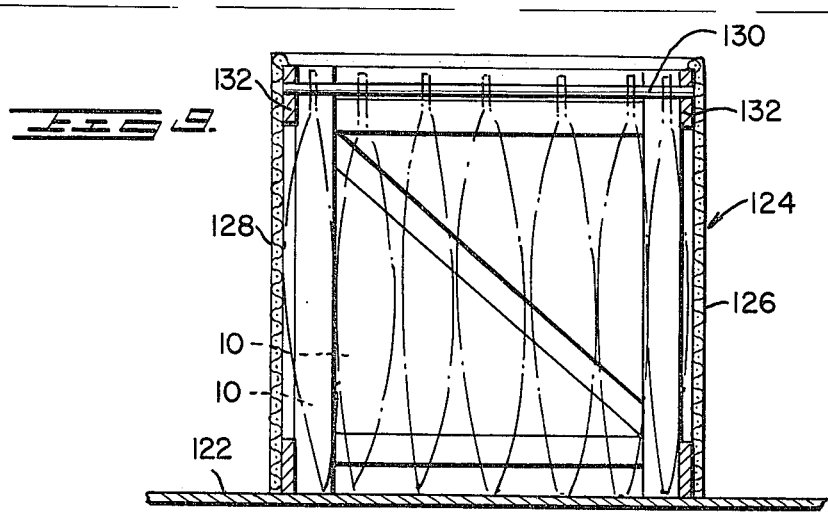

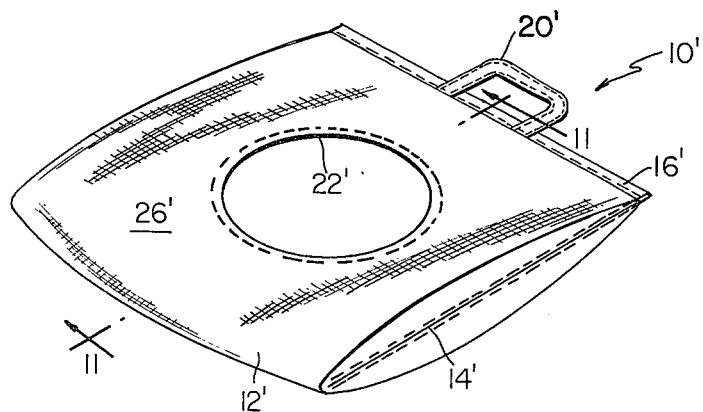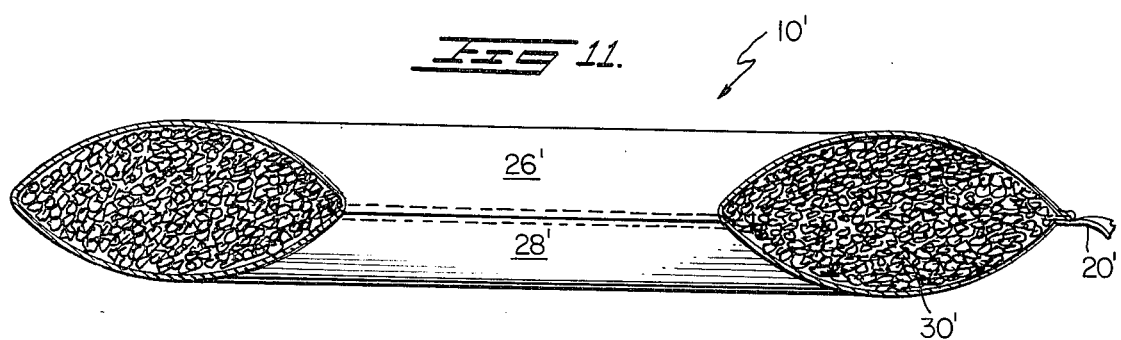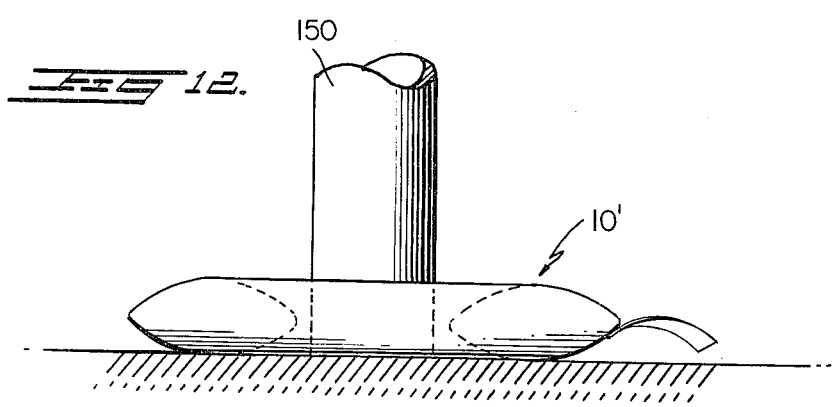

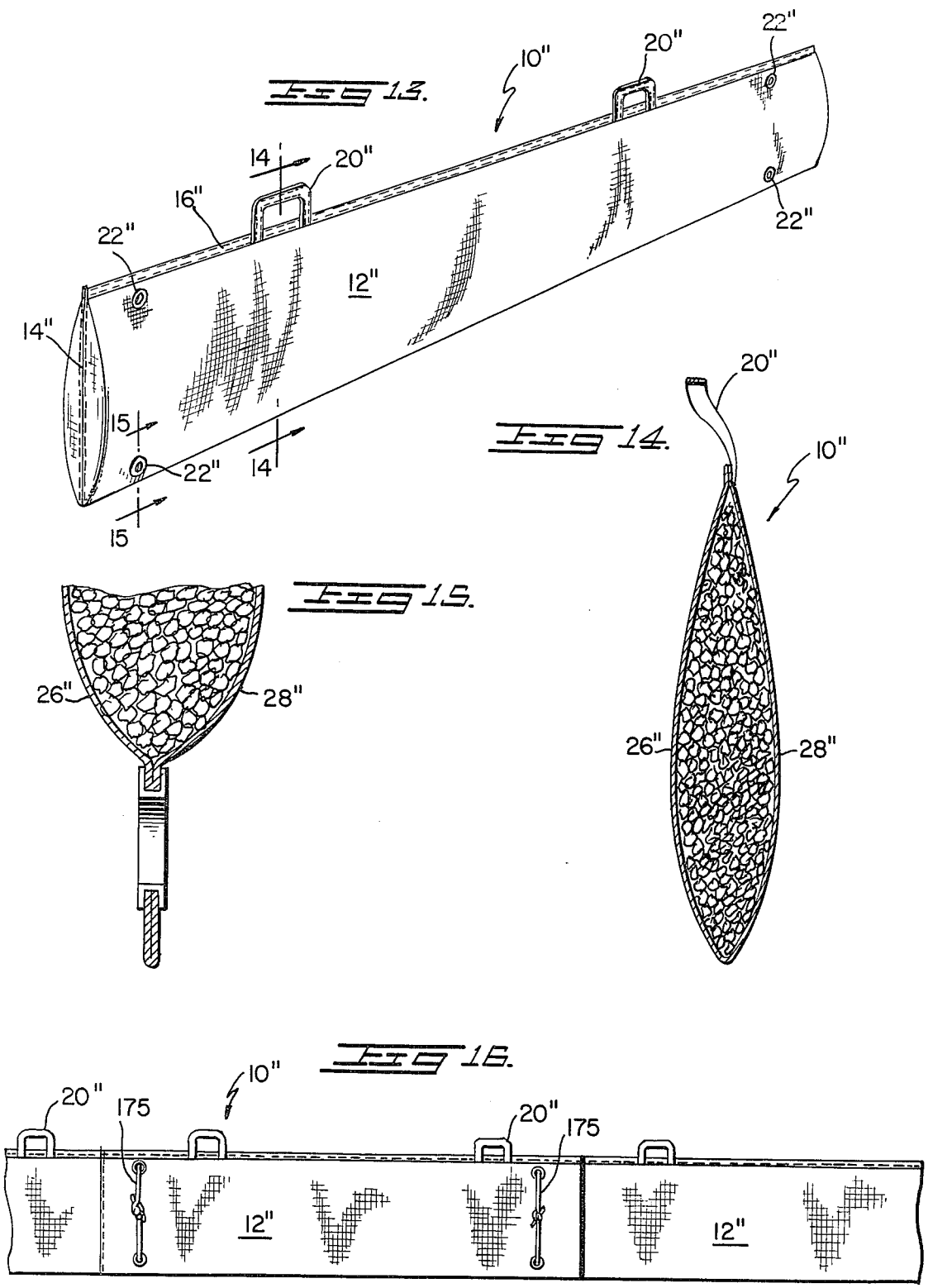

HYDROCARBON CONTAINMENT AND CONTROL SYSTEMS

CROSS-REFERENCE TO RELATED APPLICATIONS

This application is a continuation-in-part of application Ser. No. 729,713 filed Oct. 5, 1976, now U.S. Pat. No. 4,065,923.

Related subject matter is disclosed in my U.S. Pat. Nos. 4,011,175 issued Mar. 8, 1977; 3,855,152 issued Dec. 17, 1974; and 3,786,773 issued Jan. 22, 1974.

BACKGROUND OF THE INVENTION

1. Field of the Invention

A problem which has become of increasing importance in recent years is pollution of the environment and not the least noted contributor to this problem is pollution by oil spills on waterways and land areas. Public reaction and government sanctions have been so severe that such pollution is becoming an important factor in the economic survival of many industrial enterprises.

U.S. Pat. Nos. 3,855,152 and 4,011,175 disclose a method of making a composition which is extremely useful in absorbing hydrocarbons and compounds for selectively absorbing hydrocarbons which compounds, when introduced into or contacted by petroleum hydrocarbons, will selectively absorb the petroleum from land and water areas.

U.S. Pat. No. 3,786,773 is directed to a device for retaining hydrocarbons discharged from damaged holes of ships during drydocking. It is also known to provide pervious containers for hydrocarbon selective absorbents, which containers or booms effectively prevent the spread of hydrocarbon spills and selectively absorb such hydrocarbons. It is also known to provide filter tanks and pervious fencing behind which or into which oil absorbent material is maintained thereby acting as a filter medium.

SUMMARY OF THE INVENTION

The present invention is directed to a system for the simplified control and containment of oil on land and water areas wherein hydrocarbon selective absorbent material is contained in inexpensive porous woven fabric containers which due to the ease of handling materially reduces the costs of cleaning oil spills from water and land areas and in the prevention of such spills by providing ready access of hydrocarbons selective absorbent material in areas which are subject to oil pollution problems. The system also keeps to a minimum the costs of disposal of the absorbent material after it has served its function.

In general, the invention may be defined as containment of oil comprising forming a porous woven container having at least one hand grip along one edge seam, at least one opening through a pair of opposed side walls but closed to the interior of the container and an open seam, filling the container through the open seam with an oleophilic-hydrophobic-lighter than water hydrocarbon absorbent, closing the open seam, and thereafter placing the filled container in the path of hydrocarbons to be selectively absorbed.

BRIEF DESCRIPTION OF THE DRAWING

FIG. 1 is a perspective view of one form of a container for carrying out the method of the present invention;

FIG. 2 is a section on line 2—2 of FIG. 1;

FIG. 3 is a section on line 3—3 of FIG. 1;

FIG. 4 is a side elevational view of the structures shown in FIGS. 1, 2 and 3;

FIGS. 5 and 6 illustrate the use of the device shown in FIGS. 1-4 in filter boxes and filter tanks;

FIG. 7 is a vertical sectional view of a drydock showning a ship in place with the drydock submerged;

FIG. 8 is a view like FIG. 7 after the water has been expelled from the drydock;

FIG. 9 is an enlarged fragmentary view of one of the filter boxes illustrated in FIGS. 7 and 8 containing the hydrocarbon absorbent containing bags illustrated in FIGS. 1-4;

FIG. 10 is a perspective view of another form of container for oil absorbent material;

FIG. 11 is a section on line 11—11 of FIG. 10;

FIG. 12 illustrates one method of using the structures shown in FIGS. 10 and 11;

FIG. 13 is a perspective view of another form of container for oil absorbent materials;

FIG. 14 is a section on line 14—14 of FIG. 13;

FIG. 15 is a view on line 15—15 of FIG. 13; and

FIG. 16 illustrates how a plurality of the containers shown in FIGS. 13, 14 and 15 may be interconnected to form a barrier.

DESCRIPTION OF THE PREFERRED EMBODIMENTS

Referring to FIGS. 1-9 and in particular 1-4, 10 generally designates a container formed from an open weave fabric having, for example, about 48-60 threads per inch. Suitable fabrics for construction of the container 10 may be natural fibers such as cotton or linen or synthetic fibers such as the nylons, polyesters or mixtures of natural and synthetic fibers.

The container is simply formed by folding the fabric 12 upon itself and joining side seams 14 and 14' on a sewing machine. Next, a top seam 16 is partially formed leaving open portion 18 as illustrated in FIG. 1 of the drawing. At the time of forming the top seam 16, a fabric handle 20, previously formed, is stitched with the stitching forming the top seam 16.

After formation of the bag to this stage, a grommet 22 is inserted near the bottom 24 of the container with the grommet being inserted through both faces 26 and 28 of the container.

With the container at this stage, it is then filled with an oil or hyrocarbon absorbing composition. The composition may comprise a loose mass of expanded pearlite mixed with clays and a fibrous filler formed by demoisturizing an aqueous suspension of the compound and communiting the demoisturized mixture as disclosed in my U.S. Pat. Nos. 3,855,152 and 4,011,175. The container is readily filled via the opening 18 and, after filling, the opening 18 is stitched as a continuation of the stitching 16.

In an example of a useful container for carrying out the present invention, the length of the container may be about 15 inches and may have a height of about 12 inches with the opening in the grommet being about ¼ inch and the handle having a height above the top seam 16 of about 5 inches. While these dimensions are provided herein, it will be appreciated that, depending upon the ultimate use of the container, the hereinabove specified dimensions may be varied.

Referring now to FIG. 5, 50 generally designates a filter box consisting of solid bottom wall 52, solid side walls 54, solid end wall 56 and liquid pervious end wall 58. The end wall 58 may be formed from conventional wire mesh screening and the like. Interiorly of the filter box 50 are a plurality of transverse partitions generally designated 60, 62 and 64 which are formed like pervious end wall 58.

To each of the partitions 60, 62 and 64 and end wall 58 is hung one or more of the containers 10, FIGS. 1-4. The containers 10 are maintained in their illustrated positions by means of the handles 20 being placed about a hanger element 66 secured to top cross-members 68 of end wall 58 and the partitions. The lower grommet 22 of each container 10 is slipped over a further hook 70 secured to the bottom 52 of the filter box, thus each container 10 is securely held against screens 72 and 58 of the partitions and pervious end wall.

Impervious end wall 58 is provided with an opening 74 to receive a conduit or pipe 76 which directs liquids which may contain hydrocarbons into the filter box. The liquid 78 flows through the serially arranged filter containers 10 thence to discharge free of its polluting hydrocarbon. When the oil absorbing qualities of the material within each of the containers 10 is expended, the old containers 10 are readily unhooked from hooks 66 and 70 and a fresh container is inserted in its place. It will be appreciated by those skilled in the art that more than one of the containers 10 may be supported by each partition and the pervious end wall depending upon the occupational service of the filter box.

Referring now to FIG. 6, another form of filter comprises a cylindrical drum 80 having its head removed and its base 82 provided with a plurality of perforations 84. In the interior of the drum 80 and support by the bottom wall 82 are distributed a plurality of containers 10 containing the selective hydrocarbon absorbing materials. A sufficient number of the bags 10 are placed in the interior of the drum 80 so that by random chance the likelihood of having more than one of the grommets 22 in vertical alignment would be very slight. The drum 80 is supported upon a frame 84, which frame supports a further drum 86, also provided with a bottom 88 having a plurality of perforations 90 therethrough. The drum 86, like drum 80, receives a plurality of the containers 10 filled with the hydrocarbon absorbing material. The liquid, which might contain a hydrocarbon, is directed into the upper drum 80 via pipes 92 and, after the liquid passes through the containers 10 in the upper drum 80, refiltering or cleaning is carried out in the lower drum 86.

Referring to FIGS. 7, 8 and 9, 100 generally designates a floating drydock of conventional contruction. In FIG. 7, there is shown within the submerged drydock 100 a ship 110 having fuel cells 112 between bottom 114 and the ship's bottom 116. One of the cells 112 is illustrated as being ruptured as at 118. The drydock includes conventional drydock blocks 120 which supports the ship 110 within the drydock 100. Secured to the floor 122 of the drydock 100 about the periphery of the bottom 114 of the ship 110 about the zone of the rupture 118 are units generally designated 124. In general the units 124 are similar to those disclosed in my prior U.S. Pat. No. 3,786,773 in that the units 124 are constructed of framework weldable to the deck 122, which framework is covered on opposed walls 126 and 128 with a wire mesh fabric. The assemblies 124 also include a plurality of rods 130 carried by bores in top stringer members 132. These rods 130 are adapted to pass through the grommets 22 of a plurality of containers 10 constructed as disclosed in FIGS. 1-4. The height of the rods 130 above the deck 122 of the drydock 100 is such that the bags touch the deck when they are hung on the rods 130. Each of the bags 10 is filled with an oil absortive material as hereinbefore disclosed. From the foregoing and in further reference to my prior U.S. Pat. No. 3,786,773, it will be seen that, as the drydock 100 is floated, first water than oil leaving the ruptured tank 112 will be selectively absorbed or "filtered" from the water flowing through the bags 10 of each of the units 124 thereby preventing the pollution from entering the waters surrounding the floating drydock 110.

Once the oil has been absorbed into the plural bags 10, removal of the rods 130 permits disposal of the bags and insertion of new containers in an expeditious manner.

Referring to FIGS. 10-12, 10' generally designates a container formed from an open weave fabric which may be the same as the fabric employed in constructing the container 10 of FIGS. 1-4.

The container is simply formed by folding the fabric 12' upon itself and joining side seams 14' on a sewing machine. Next, a top seam 16' is partially formed leaving an open portion for filling. At the time of forming the top seam 16', a fabric handle 20', previously formed, is stitched with the stitching forming the top seam 16'.

After formation of the bag to this stage, a large grommet or opening 22' is insert or formed in the center of the container through both faces 26' and 28' of the container.

With the container at this stage, it is then filled with an oil or hydrocarbon absorbing composition. The container is readily filled via the opening and, after filing, the opening is stitched as a continuation of the stitching 16'.

The structure 10' has many uses, one of which is illustrated in FIG. 12. In FIG. 12, the container 10' is illustrated as being positioned about a filler pipe 150, which filler pipe may be associated with an underground fuel or oil storage tank. The attendant bring fuel to the tank places the container 10 about the filler pipe 150, thus any spillage is immediately absorbed by the hydrophobic oil absorbing material 30' within the container. Container of this construction would be carried by delivery trucks and the like for ready availability at the particular site.

Referring now to FIGS. 13-16, a further modified form of containers for carrying out the methods of the present invention is illustrated.

In FIGS. 13-16, 10" generally designates a container formed from an open weave fabric which may be of the same form as the fabric described in reference to FIGS. 1-4.

The container is simply formed by folding the fabric 12" upon itself and joining side seams 14" on a sewing machine. Next, a top seam 16" is partially formed leaving one or more open portions for filling the container. At the time of forming the top seam 16", plural fabric handles 20", previously formed, are stitched with the stitching forming the top seam 16".

After formation of the bag to this stage, a pair of grommets 22" are inserted near the top and bottom of each end of the container with the grommets being inserted through both faces 26" and 28" of the container.

With the container at this stage, it is then filled with an oil or hydrocarbon absorbing composition. The composition may comprise a loose mass of expanded pearlite mixed with clays and a fibrous filler formed by demoisturizing an aqueous suspension of the compound and communiting the demoisturized mixture as disclosed in my U.S. Pat. Nos. 3,855,152 and 4,011,175. The container is readily filled via the one or more openings left in the top and, after filling, the openings are stitched as a continuation of the stitching 16".

In an example of a useful container for carrying out the present invention, the length of the container may be about 4 feet and may have a height of about 12 inches with the openings in each of the grommets being about ½ inch and the handles having a height above the top seam 16" of about 5". While these dimensions are provided herein, it will be appreciated that, depending upon the ultimate use of the container, the hereinabove specified dimensions may be varied.

The openings formed by the grommets 22" at each of the containers may be used to anchor the containers in filter boxes and the like, or as illustrated if FIG. 16, plural containers 10" may be joined one to another by lacings 175 to provide an elongated filter barrier. In order to insure apply overlap, filter bags as constructed and shown in FIGS. 13-15, the grommets 22" would be positioned about 4 inches from the edges of the container.

What has been set forth above is intended as exemplary of the present invention to enable those skilled in the art to practice the invention and what is new and therefore claimed and desired to be protected by Letters Patent of the United States is:

1. Apparatus for controlling and containing oil and the like hydrocarbons comprising a porous woven container, at least one hand grip along one edge seam thereof, at least one opening through a pair of opposed side walls but closed to the interior of the container and a closable open seam along at least one edge thereof, wherein the at least one opening through a pair of opposed side walls of the container is: centrally positioned on the container; along an edge opposite to the edge having the at least one hand grip; or the container has spaced pairs of said at least one opening through a pair of opposed side walls and said pair of openings are positioned along side edges of the container; and further wherein the porous woven container is filled with a loose mass of an oleophilic-hydrophobic-lighter than water hydrocarbon absorbent consisting of expanded pearlite mixed with clays and a fibrous filler.

* * * * *